United States Patent [19]

Whiting

[11] 4,106,732
[45] Aug. 15, 1978

[54] CAMPER TRAILER

[76] Inventor: Ernest Henry Whiting, 218-222 Balaclava Rd., Caulfield, Victoria, Australia, 3162

[21] Appl. No.: 738,295

[22] Filed: Nov. 3, 1976

[30] Foreign Application Priority Data

Nov. 5, 1975 [AU] Australia ............... PC3842
Aug. 16, 1976 [AU] Australia ............... PC7008

[51] Int. Cl.$^2$ ............................................. B60P 3/32
[52] U.S. Cl. ..................................... 296/23 C; 52/67
[58] Field of Search ............... 296/23 R, 23 C; 52/67

[56] References Cited

U.S. PATENT DOCUMENTS

| 2,168,062 | 8/1939 | Daney | 296/23 C |
| 2,756,094 | 7/1956 | Marple | 296/23 C |
| 2,893,780 | 7/1959 | Ervine | 296/23 C |
| 3,740,088 | 6/1973 | Ratcliff | 296/23 |

Primary Examiner—Philip Goodman

Attorney, Agent, or Firm—Andrus, Sceales, Starke & Sawall

[57] ABSTRACT

The present invention provides a camper trailer comprising a base having upstanding sides and a top having a roof and sides depending from the roof; and wherein the top is raisable from a lowered position in which the sides of the base and the top are telescoped one within the other to a raised position in which the sides of the base and the top are in at least substantially untelescoped condition.

In a more preferred construction, the top comprises a first member having a roof portion having depending sides and open at one end and an end member having a roof portion, depending sides and a depending end wall; and wherein the end member is movable generally horizontally from a retracted position, in which the sides of the end member and said first member are telescoped one within the other, to an extended position, in which the sides of the end member and said first member are in at least substantially untelescoped condition.

3 Claims, 9 Drawing Figures

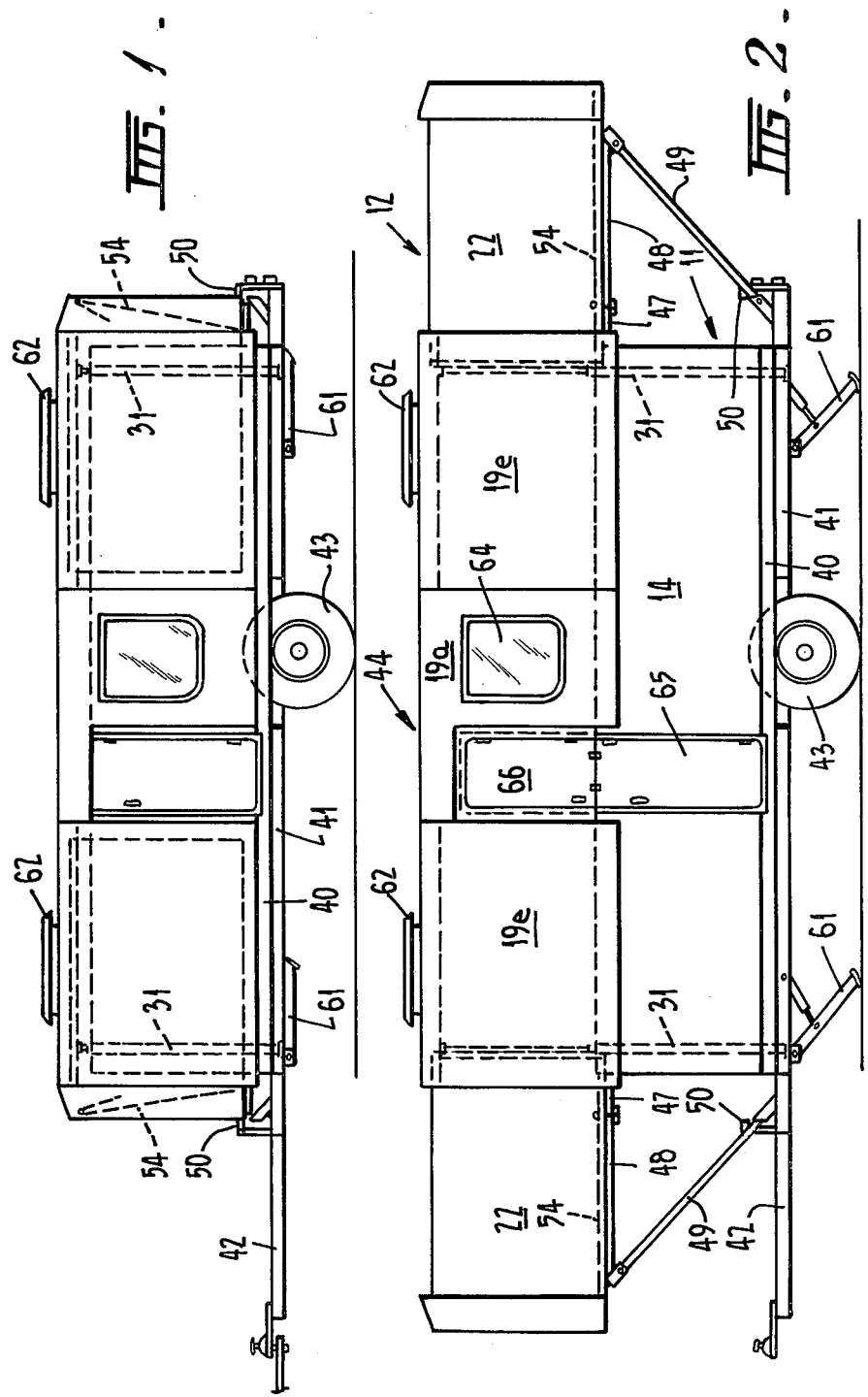

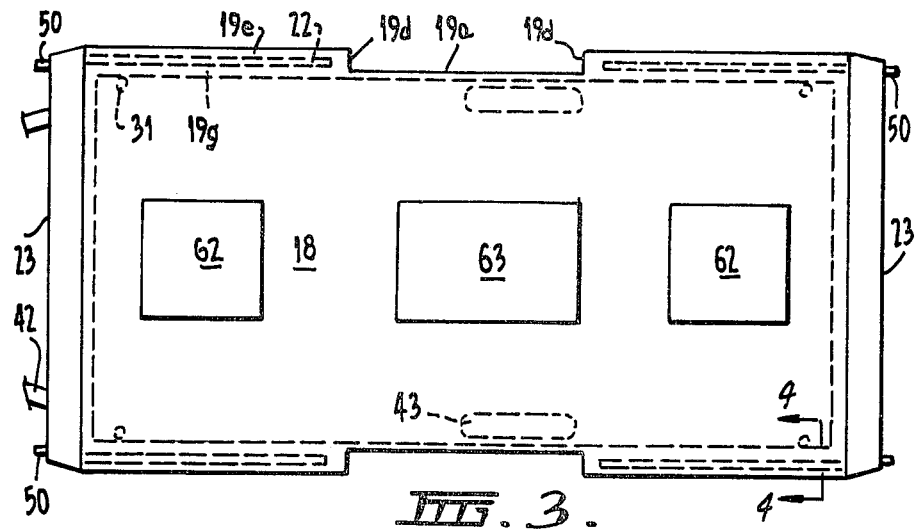
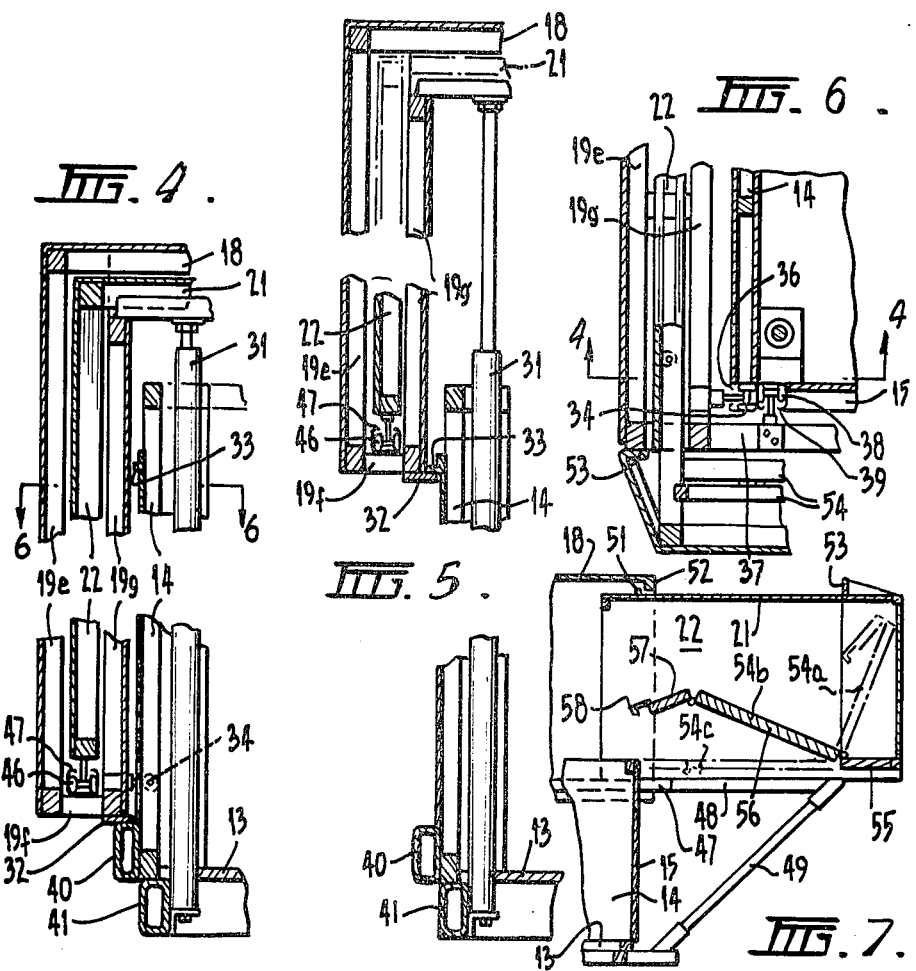

CAMPER TRAILER

BACKGROUND OF THE INVENTION

1. Field of the Invention

This invention relates to a camper trailer.

2. Description of Prior Art

Camper trailers are known which comprise a base unit and a roof unit; the roof unit being raisable from a lowered position in which it rests on the base unit to a raised position in which it is supported above the base unit and in which canvas or other flexible sheet material is used to fill the gap between the roof unit and the base unit when the roof unit is in the raised position.

However, canvas is prone to rotting, sometimes lets water through, can be difficult to fold when wet, if stored when wet it may affect other things, and also is a very poor insulating material. Similar problems occur with other flexible sheet materials except that synthetic plastics materials are usually not prone to rotting and are water proof.

Thus, known camper trailers have had limited appeal.

On the other hand, camper trailers as described above are light-weight and, when in the lowered condition, are considerably more stable to tow than conventional caravans.

The present invention seeks to provide an improved camper trailer.

SUMMARY OF THE INVENTION

The present invention provides a camper trailer comprising a base having upstanding sides and a top having a roof and sides depending from the roof; and wherein the top is raisable from a lowered position in which the sides of the base and the top are telescoped one within the other to a raised position in which the sides of the base and the top are in at least substantially untelescoped condition.

PREFERRED ASPECTS OF THE INVENTION

Preferably in the raised position, the internal head room is at least 5 feet 8 inches, more preferably 6 feet and still more preferably 6 feet 3 inches. However, in the lowered position the overall height preferably does not exceed 5 feet.

It is most preferred that the sides of the base and the sides of the top are each at least 3 feet high but preferably are not more than 4 feet high. In this respect, it is preferred that the length of the sides of the base and the top, measured vertically, is such as to provide a head room within the camper trailer when in said raised position of at least 5 feet 6 inches and preferably 5 feet 8 inches, more preferably 6 feet and still more preferably 6 feet 3 inches and also to allow some overlap between the sides of the base and the sides of the top.

Preferably, in the raised position, the sides of the base and the top are not in completely untelescoped condition. To ensure that this occurs stop means may be provided to stop raising of the top by more than a predetermined amount and such stop means may also serve to provide a weather-tight seal between the base and the top.

It is preferred that the sides of the base should, in the lowered position, be telescopically received within the top.

Lock means may be provided to maintain the top in the raised position.

In one construction, the upper ends of the sides of the base and the lower ends of the sides of the top have formations adapted to constitute said stop means; and preferably also weather seal means. Those formations may conveniently comprise channels capable of interlocking with one another.

Hydraulic or mechanical means may be provided for raising and lowering the top. Suitable hydraulic means is marketed by Dunford Engineering.

In a more preferred construction, the top comprises a first member having a roof portion having depending sides and open at one end and an end member having a roof portion, depending sides and a depending end wall; and wherein the end member is movable generally horizontally from a retracted position, in which the sides of the end member and said first member are telescoped one within the other, to an extended position, in which the sides of the end member and said first member are in at least substantially untelescoped condition.

It is possible that the end member is telescopable outside of said first member but it is currently preferred that the end member is telescopable within said first member. This last will leave the roof portion free to have hatches therein and/or to carry windows, air conditioners, water tanks, solar heater or other integers.

Preferably, the top comprises said first member and two such end members.

By the use of such end members, the length of the top of the camper trailer may be extended.

As previously, the sides of the end members and said first member, when in the extended position, are preferably not completely untelescoped and similarly stop means and weather seal means may be provided.

It is also possible that the camper trailer is provided with members capable of closing the undersides of the end members when in the extended positions. Such members are conveniently platforms capable of lying against the end walls when in the retracted position and which are movable to close the undersides of the end members when in the extended position. These platforms are conveniently pivotally mounted to the lower ends of the end walls or the upper ends of the base and in the extended position bridge from those lower ends to the upper end of the base or from those upper ends to the lower ends of the end walls. Beds may be mounted to those platforms.

Tracks may be provided for the end members to run on. Such tracks may be foldable or extendable for use.

Stays may be provided to support the tracks for the end members or the members in the extended position. Those stays preferably extend from the base.

The preferred form of the base is that of an open topped box. The preferred form of the top is that the first member is a box which has a top and two oppositely disposed sides but no ends or bottom. The preferred form of the end members is boxes which have a top and two oppositely disposed sides and one end but with the other end and bottom absent.

The base and top may be fabricated from timber, metal or synthetic plastics material. A number of materials may also be used.

A door for the camper trailer is conveniently provided by a door in each of the base and the first member; the two doors being substantially in alignment. Alternatively, removable doors and/or panels may be provided for one or both of the base and the first member.

Two specific constructions of camper trailers in accordance with this invention will now be described by way of example.

DESCRIPTION OF THE VIEWS OF THE DRAWINGS

FIG. 1 is a side elevation of one camper trailer and shows it in retracted condition, FIG. 2 is a side elevation of said one camper trailer and shows it in extended condition, FIG. 3 is a top plan view of said one camper trailer, FIG. 4 is a fragmentary cross-section on line 4—4 in FIG. 3 (also line 4—4 in FIG. 6) and shows parts as they are in the retracted condition, FIG. 5 is a fragmentary cross-section corresponding to FIG. 4 but shows parts as they are in the extended condition, FIG. 6 is a fragmentary cross-section on line 6—6 in FIG. 4, FIG. 7 is a fragmentary cross-section of said one camper trailer.

DETAILED DESCRIPTION

Figure 8:
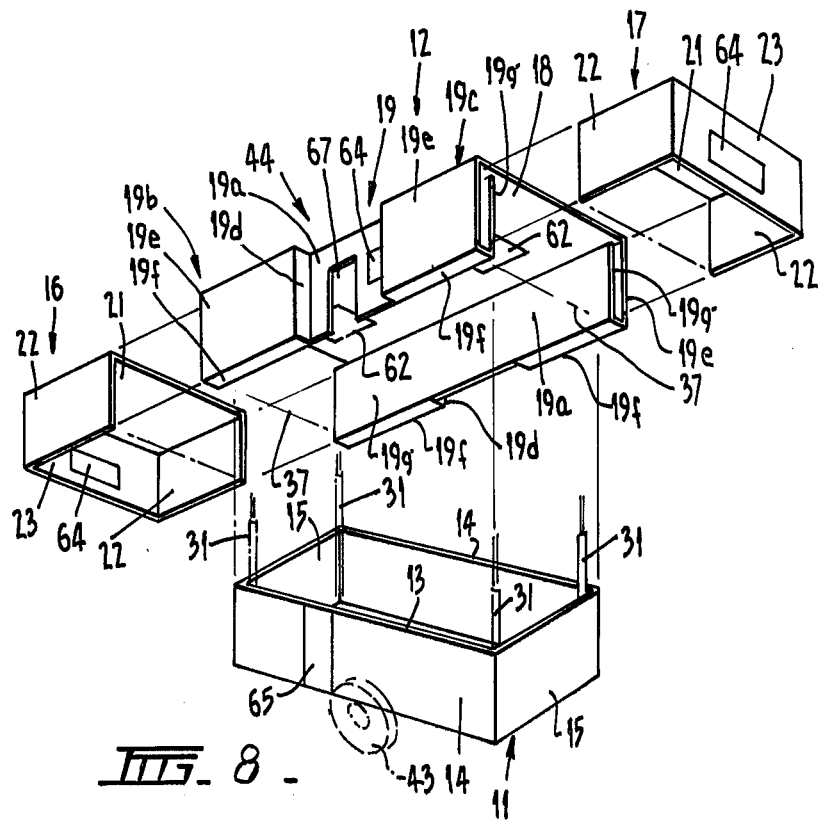
FIG. 8 is a schematic perspective view of said one camper trailer but is shown without the certain parts including chassis and draw bar which will be present when the camper trailer is to be used.

The general arrangement of the camper trailer shown in FIGS. 1 - 8 is best seen in FIG. 8.

The camper trailer as depicted in FIG. 8 comprises a base 11 and a top 12. The base 11 is in the form of an open topped box having a bottom 13, upwardly extending sides 14 and upwardly extending ends 15.

The base 10 is supported on a chassis comprised of beams 40 and 41 and a draw bar 42 and wheels 43 are secured to the chassis (see FIGS. 1 and 4).

The top 12 can generally be described as a box which is open at the bottom. The top 12 includes a central portion 44 and two end portions 16 and 17.

The central portion 44 can be described as a box which is open at its ends and at its bottom. The central portion 44 has a roof 18 and sides 19.

The end portions 16 and 17 can generally be described as boxes which are open at one end and at the bottom. Each end portion includes a roof 21, sides 22 and one end 23.

It will be observed in FIG. 8 that the sides 19 of the central portion 44 comprise a middle part 19a and two end parts 19b and 19c. Each of the end parts 19b and 19c comprises a panel 19d, a wall 19e depending from the roof 18, a web 19f and a wall 19g ascending from the web 19f and terminating short of the roof 18. The panels 19d, walls 19e, webs 19f and walls 19g define compartments in which the sides 22 of the end portions 16 and 17 are telescopically receivable. Thus, the end portions 16 and 17 may thus be retracted into, or extended from, the central portion 44.

The top 12 is also telescopically receivable over the base 11 and is retractable over, or extendable from, the base 11.

With the end portions 16 and 17 telescopically retracted into the central portion 44 and with the top 12 telescopically retracted over the base 11, the camper trailer has the appearance indicated in FIG. 1. This will be the usual condition of the camper trailer for towing.

The camper trailer also includes four hydraulic rams 31 which are mounted at their bottoms in corners of the base 11 and, at their tops, to the top 12 and, more specifically, to corners of the central portion 44.

The rams 31 can be operated to raise, or permit controlled lowering of, the top 12. In this respect, in FIG. 1, the top 12 is shown in retracted position and it is to be noted that the sides 14 and ends 15 are telescopically received within the top 12. Further, in FIG. 2, the top 12 is shown in the extended position in which the sides 14 and ends 15 are substantially not telescoped within the top 12.

When the top 12 is in the extended position, the end portions 16 and 17 can be moved from the retracted position shown in FIG. 1 to the extended position shown in FIG. 2.

Thus, the camper trailer is made retractable for easy storage and for towing and is extendable for use.

Additional constructional details of the camper trailer shown in FIGS. 1 - 7 are described below.

Upward movement of the top 12 may be limited by the extendability of the rams 31 but flanges 32 and 33 respectively on the central portion 44 and upper ends of the sides 14 can come into abutment to limit upward movement and can also serve to weather proof; particularly if a compressible strip of material such as synthetic plastics foam is used in conjunction with the flanges 32 and 33. Further, downward movement of the top 12 may be limited by the retractability of the rams 31 but may also be achieved by abutment of flange 32 with beam 40.

The lower ends of the central portion 44 carry wheels 34 which are located in guide tracks 36 which extend upwardly on sides 14. Beams 37 extends between the lower ends of the central portion to give strength and stability thereto and carry wheels 38 which are located in guide tracks 39 which extend upwardly on ends 15. The engagement of wheels 34 and 38 with tracks 36 and 39 guide the top 12 in raising and lowering on the base 11.

The lower ends of the sides 22 carry wheels 46 and the webs 19f carry guide tracks 47 which extend beyond the ends of the central portion 44. Extensions 48 of those guide tracks are stored when not required in beam 40 and may be secured to the tracks 47 as shown in FIG. 2 and supported by stays 49. Those tracks 47 and the extensions 48 serve to guide the end portions 16 and 17 in being extended from, and retracted into, the central portion 44.

Safety stops 51 and 52 are provided to prevent the end portions 16 and 17 from being withdrawn from the central portion beyond a predetermined amount and stops 50 are provided so that the end portions 16 and 17 may not accidentally become extended from the central portion 44 when it is in the retracted condition of FIG. 1. The stops 51 and 52 can also serve to restrict wind and rain from entering the camper trailer and foam strip may be provided to improve weather sealing. Similar stops to stops 51 and 52 may be provided on the sides 22 and wall 19g to serve the dual purposes of safety stopping and weather sealing.

The end portions 16 and 17 carry abutments 53 which can abut with the ends of the walls 19e and roof 18 to weather seal.

The end portions 16 and 17 also carry platforms 54 comprised of a first part 55 fixed to the respective end portions 16 and 17, a second part 56 which is pivotally attached to the part 55 and a third part 57 which is pivotally attached to the part 56. The parts 57 carry hooks 58. In consequence of those pivotal attachments, the platforms 54 can be folded as shown as 54a in FIG. 7, be partially unfolded as shown as 54b in FIG. 7 and be fully unfolded as shown as 54c in FIG. 7.

In the folded position, the platform 54 does not interfere with retraction and extension of the end portions 16 and 17 and in the fully unfolded position the hooks 58 engage with the upper ends of the ends 15 and the platforms can serve as bases for beds and also to seal the undersides of the end portions 16 and 17 against weather.

The camper trailer has stabilizing legs 61 which may be lowered when it is desired to stabilize. Those legs are conveniently hydraulically operated.

The roof 18 is provided with skylights 62 and a solar water heater 63 and it will be observed that no interference of the skylights and heater occurs when the end portions 16 and 17 are extended and retracted.

The camper trailer is also provided with windows 64 and a door 65 is located in one of the sides 14 and a removable hinged panel 66 is provided for filling the opening 67 in the middle part 19a of the central portion 44 and to serve as a door.

Electrical wiring and plumbing lines may be run through one or both of beams 40 and 41.

The above described camper trailer has a frame of tubular metal clad with metal, plywood or synthetic plastics materials or mixture thereof. An actual construction has been found to be strong, weather resistant and easy to use.

The actual construction had a length of 15 foot and internal head room of 4 feet 6 inches when the top was retracted and 6 feet 3 inches when the top 12 was extended.

Figure 9:
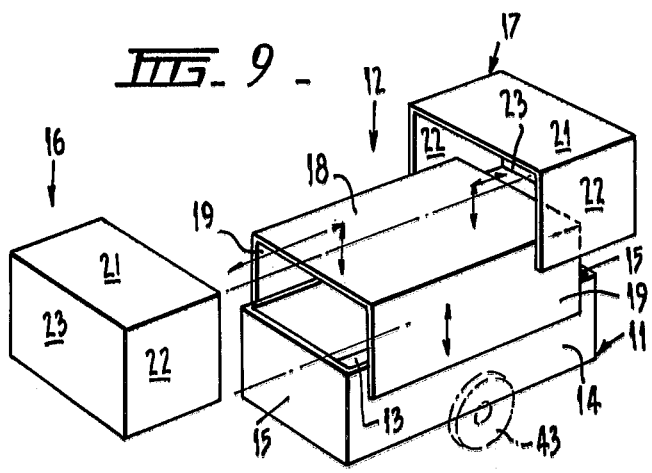
FIG. 9 is a schematic perspective view of another camper trailer but is shown without certain parts including chassis and draw bar which will be present when the camper trailer is to be used.

A modification of the camper trailer of FIGS. 1 - 8 is shown schematically in FIG. 9 and like reference numerals denote like parts.

The camper trailer of FIG. 9 differs from that of FIGS. 1 - 8 in that the end portions 16 and 17 are received over the central portion 44.

Although the camper trailer of FIG. 9 is practical, it is not considered to be as advantageous as that of FIGS. 1 - 8.

Modifications and adaptations may be made to the above described without departing from the spirit and scope of this invention which includes every novel feature and combination of features disclosed herein.

The claims form part of the disclosure of this specification.

I claim:

1. A camper trailer comprising a base having upstanding sides and a top having a roof and sides depending from the roof; wherein the top is raisable from a lowered position in which the sides of the base and top are telescoped one within the other to a raised position in which the sides of the base and the top are in at least substantially untelescoped condition; wherein the top includes a first member having depending sides and which is open at one end and an end member having a roof portion, depending sides and a depending end wall and wherein the end member is movable generally horizontally from a retracted position, in which the sides of the end member and said first member are telescoped one within the other, to an extended position, in which the sides of the end member and said first member are in at least substantially untelescoped condition, and including a platform capable of closing the underside of the end member when in the extended position, the platform being pivotally attached to the camper trailer and being movable from a generally horizontal position, in which it closes the underside of the end member, to a generally vertical stored position.

2. A camper trailer as claimed in claim 1, wherein the pivotal attachment of the platform is to the end member.

3. A camper trailer as claimed in claim 1, wherein the first member is open at both ends and two such end members and two such platforms are provided.

* * * * *